(12) United States Patent
Feng et al.

(10) Patent No.: US 11,703,564 B2
(45) Date of Patent: Jul. 18, 2023

(54) RADAR AND COMMUNICATION INTEGRATED COOPERATIVE DETECTION METHOD AND APPARATUS BASED ON BEAM POWER DISTRIBUTION

(71) Applicant: Beijing University of Posts and Telecommunications, Beijing (CN)

(72) Inventors: Zhiyong Feng, Beijing (CN); Zixi Fang, Beijing (CN); Zhiqing Wei, Beijing (CN); Ping Zhang, Beijing (CN); Qixun Zhang, Beijing (CN); Xiaoqi Qin, Beijing (CN)

(73) Assignee: BEIJING UNIVERSITY OF POSTS AND TELECOMMUNICATIONS, Beijing (CN)

( * ) Notice: Subject to any disclaimer, the term of this patent is extended or adjusted under 35 U.S.C. 154(b) by 86 days.

(21) Appl. No.: 17/420,283

(22) PCT Filed: Jun. 15, 2020

(86) PCT No.: PCT/CN2020/096110
§ 371 (c)(1),
(2) Date: Jul. 1, 2021

(87) PCT Pub. No.: WO2021/012833
PCT Pub. Date: Jan. 28, 2021

(65) Prior Publication Data
US 2022/0057483 A1  Feb. 24, 2022

(30) Foreign Application Priority Data
Jul. 25, 2019 (CN) .......................... 201910676137.1

(51) Int. Cl.
*G01S 7/40* (2006.01)
*G01S 7/00* (2006.01)
(Continued)

(52) U.S. Cl.
CPC .............. *G01S 7/40* (2013.01); *G01S 7/006* (2013.01); *G01S 7/4013* (2021.05); *G01S 13/006* (2013.01); *G01S 13/91* (2013.01)

(58) Field of Classification Search
CPC .......... G01S 7/40; G01S 7/4013; G01S 7/006; G01S 13/006; G01S 13/91
See application file for complete search history.

(56) References Cited

U.S. PATENT DOCUMENTS

2014/0339501 A1   11/2014   Bennett et al.
2017/0195362 A1   7/2017   Schweitzer, III et al.

FOREIGN PATENT DOCUMENTS

CN   106911605 A   6/2017
CN   108387890 A   8/2018
(Continued)

OTHER PUBLICATIONS

Bo, X. I. A. O., H. U. O. Kai, and L. I. U. Yongxiang. "Development and Prospect of Radar and Communication Integration." 电子与信息学报 41.3 (2019): 739-750. (Year: 2019).*
(Continued)

*Primary Examiner* — Peter M Bythrow
*Assistant Examiner* — Nazra Nur Waheed
(74) *Attorney, Agent, or Firm* — Patent Portfolio Builders PLLC

(57) ABSTRACT

Provided are a radar communication integrated cooperative detection method and apparatus based on beam power distribution. The method comprises: determining a farthest detection distance and a detection volume of a single radar in a radar communication integrated system during transmitting of a detection beam when the radar has a preset transmit power; determining a communication success probability of each pair of radars during transmitting communication beams; determining a detection area volume of each
(Continued)

pair of radars under different power distribution coefficients based on the farthest detection distance, the detection volume, a different power distribution coefficient of the single radar, and the communication success probability of each pair of radars; determining a power distribution coefficient corresponding to a largest detection area volume from different detection area volumes as a current power distribution coefficient; and determining total detection volume of the radar communication integrated system based on the detection area volume of each pair of radars and the current power distribution coefficient.

14 Claims, 3 Drawing Sheets

(51) Int. Cl.
  *G01S 13/00* (2006.01)
  *G01S 13/91* (2006.01)

(56) References Cited

FOREIGN PATENT DOCUMENTS

| | | | |
|---|---|---|---|
| CN | 108834208 A | * 11/2018 | |
| CN | 108834208 A | 11/2018 | |
| CN | 109672488 A | 4/2019 | |
| CN | 109743084 A | 5/2019 | |
| CN | 110007277 A | 7/2019 | |
| CN | 110261848 A | 9/2019 | |
| WO | WO-2014125447 A1 | * 8/2014 | ........... G01S 13/003 |
| WO | 2018118195 A1 | 6/2018 | |

OTHER PUBLICATIONS

Bo Xiao et al., "Development and Prospect of Radar and Communication Integration," Journal of Electronics & Information Technology, Mar. 2019, pp. 739-750, vol. 41, No. 3, including partial English translation.

George N. Saddik et al., "Ultra-Wideband Multifunctional Communications/Radar System," IEEE Transactions on Microwave Theory and Techniques, Jul. 2007, pp. 1431-1437, vol. 55, No. 7.

International Search Report / Written Opinion dated Sep. 22, 2020 in related/corresponding PCT Application No. PCT/CN2020/096110, including partial English translation.

* cited by examiner

RADAR AND COMMUNICATION INTEGRATED COOPERATIVE DETECTION METHOD AND APPARATUS BASED ON BEAM POWER DISTRIBUTION

The present application is a U.S. National Stage of PCT/CN2020/096110 filed Jun. 15, 2020, which claims the priority to a Chinese Patent Application No. 201910676137.1, filed with the China National Intellectual Property Administration on Jul. 25, 2019 and entitled "RADAR AND COMMUNICATION INTEGRATED COOPERATIVE DETECTION METHOD AND APPARATUS BASED ON BEAM POWER DISTRIBUTION", which are incorporated herein by reference in their entirety.

TECHNICAL FIELD

This application relates to the field of wireless communication technology, and in particular to a radar communication integrated cooperative detection method and apparatus based on beam power distribution

BACKGROUND

With the rapid development of communication technology, wireless communication and networking technologies have been widely used, and multiple radars cooperative detection based on wireless communication has gradually become an important research direction in the field of integration. As a key technology that affects the deep integration of radar communication, power distribution technology is extremely important for achieving data-level and signal-level fusion among multiple radars. For example, for certain airspaces that have restricted requirements for flying objects, in scenarios such that multiple small and mobile radar stations are cooperated for illegal drone detection, reasonable power distribution has significant advantages in increasing the detection radius and improving tracking accuracy.

The existing radar communication integration technology can be realized based on the integrated beam sharing technology of co-design of radar communication, that is, detection beam and the communication beam of a radar are integrated, thereby reducing the complexity of the radar system and improving the response time of the radar system. For example, the multiple radars cooperative networking technology is an implementation solution of the above-mentioned integrated beam sharing technology. Based on the integrated beam sharing technology, multiple radars can be networked together, and the multiple radars can form a network for cooperative detection.

Multiple radars beam power distribution refers to the power distribution of a detection beam and a communication beam of each radar. The multiple radars beam power distribution needs to consider a problem of interfering communication signals by strong radar transmit power. However, the use of frequency division technology for physically isolating radar signals (the detection beams) and communication signals (the communication beams) will greatly reduce the efficiency of spectrum utilization. In addition, since the total power of the radar transmitter is constant, the more power distributed to the detection beam, the better its detection performance, but the power distributed to the communication beam will be reduced, which in turn will affect the successful transmission of detection messages between radars. On the contrary, the more power distributed to the communication beam, the higher the signal-to-noise ratio at the receiving end, and the better the quality of the wireless communication link between radars, but the power distributed to the detection beam will be reduced, which in turn will affect the radar detection efficiency. Therefore, how to reasonably distribute the power of the detection beams and the power of communication beams of radars to maximize the multiple radars cooperative detection efficiency under the premise of ensuring the communication quality has become an urgent technical problem to be solved.

SUMMARY

The purpose of the embodiments of the present application is to provide a radar communication integrated cooperative detection method and apparatus based on beam power distribution, so as to further improve the radar detection efficiency. Specifically, the technical solutions are as follows.

In a first aspect, an embodiment of the application provides a radar communication integrated cooperative detection method based on beam power distribution, which is applied to a radar communication integrated system comprising multiple pairs of radars and each pair of radars having ability to cooperatively transmit detection beams and communication beams, the method comprises:

determining a farthest detection distance and a detection volume of a single radar in a radar communication integrated system during transmitting of the detection beam when the radar has a preset transmit power;

determining a communication success probability of each pair of radars in the radar communication integrated system during transmitting of the communication beams, wherein the communication success probability represents a probability of successfully establishing a connection of communication links between a pair of radars;

determining a detection area volume of each pair of radars under different power distribution coefficients based on the farthest detection distance, the detection volume, a different power distribution coefficient of the single radar, and the communication success probability of each pair of radars, wherein the power distribution coefficient is a ratio between power distributed to the detection beam and power distributed to the communication beam;

determining a power distribution coefficient corresponding to a largest detection area volume from different detection area volumes as a current power distribution coefficient; and determining total detection volume of the radar communication integrated system based on the detection area volume of each pair of radars and the current power distribution coefficient.

Optionally, determining the farthest detection distance and the detection volume of the single radar in the radar communication integrated system during transmitting of the detection beam when the radar has the preset transmit power, comprises:

determining the farthest detection distance of the single radar in the radar communication integrated system during transmitting of the detection beam using a first preset expression when the radar has the preset transmit power, wherein, the first preset expression is:

$$D_{max}^4 = \frac{P_R G^2 \lambda_w^2 \sigma}{(4\pi)^3 k T_0 B_n F_n (SNR_{min})},$$

in the expression, $P_R$ represents power of the detection beam; G represents antenna gain; $\lambda_w$ represents a wavelength of the detection beam; $\sigma$ represents a radar cross-sectional area for a detected target; k represents the Boltzmann constant; $T_0$ represents a standard temperature; $B_n$ represents a bandwidth for a receiver in the radar; $F_n$ represents a noise coefficient; and $SNR_{min}$ represents a minimum detectable signal-to-noise ratio for the radar; and determining the detection volume of the single radar in the radar communication integrated system during transmitting of the detection beam using a second preset expression when the radar has the preset transmit power, wherein, the second preset expression is:

$$V = \frac{2}{3}\pi(\gamma P_R)^{\frac{3}{4}}(1-\sin w),$$

in the expression $$\gamma = \frac{G^2 \lambda_w^2 \sigma}{(4\pi)^3 k T_0 B_n F_n (SNR_{min})};$$

$P_R$ represents the power of the detection beam; and w represents a radar elevation.

Optionally, determining the communication success probability of each pair of radars in the radar communication integrated system during transmitting of the communication beams, comprises:

determining the communication success probability of each pair of radars in the radar communication integrated system during transmitting of the communication beams using a third preset expression when the radar has the preset transmit power, wherein the third preset expression is:

$$P(\text{SINR} > \theta) = \exp\left(-\theta x_1^\alpha \frac{N}{P_C}\right) \exp[-\kappa \lambda U(\theta, x_1, \alpha)],$$

in the expression, $\theta$ represents a threshold of communication success probability; $x_1$ represents a distance between a pair of radars; a represents a large-scale fading factor of wireless channel; $x_1^\alpha$ represents a path loss; N represents noise intensity; $P_c$ represents power of a communication beam; K represents a directional factor of a directional antenna; $\lambda$ represents a radar distribution density; U represents an integral function $$U(\theta, x_1, \alpha) = \int_0^{2\pi}\int_0^\infty \left(1 - \frac{1}{1+\theta x_1^\alpha r^{-\alpha}}\right) r\, dr\, d\varphi,$$

wherein, and r represents an integration factor of a preset distance, $\varphi$ represents an integration factor of a preset angle.

Optionally, determining the detection area volume of each pair of radars under different power distribution coefficients based on the farthest detection distance, the detection volume, a different power distribution coefficient of the single radar, and the communication success probability of each pair of radars, comprises:

determining a detection area volume of each pair of radars when the radar has the preset transmit power using a fourth preset expression, wherein, the fourth preset expression is:

$$V_c(D,\beta) = P(\text{SINR}>\theta) V_{Overlap} + [1-P(\text{SINR}>\theta)]V,$$

in the expression, $V_c$ represents a detection area volume of a pair of radars; $V_c(D, \beta)$ represents a cooperative detection volume of a pair of radars, and this value is affected by two factors D and $\beta$; D represents a upper limit of a distance that a single radar can detect when a power coefficient is given for the single radar; $\beta$ represents a preset power distribution coefficient; $P(\text{SINR}>\theta)$ represents the communication success probability; $V_{overlap}$ represents a volume of overlapped areas detected by a pair of radars cooperatively; and V represents a detection volume of the single radar.

Optionally, determining the total detection volume of the radar communication integrated system based on the detection area volume of each pair of radars and the current power distribution coefficient, comprises:

determining the total detection volume of the radar communication integrated system using a fifth preset expression when the radar has the preset transmit power, wherein, the fifth preset expression is:

$$V_n(D, \beta, x_i) = \sum_{i=1}^{n-1} V_c(i) - (n-2)V,$$

in the expression, $V_n$ represents the total detection volume; $V_c(D, \beta, x_i)$ represents total cooperative detection volume of multiple radars, and this value is affected by three factors D, $\beta$ and $x_i$; D represents a upper limit of the distance that a single radar can detect when a power coefficient is given for the single radar; $\beta$ represents a preset power distribution coefficient; i represents the i-th pair of radars; $x_i$ represents a distance between the i-th pair of radars; $V_c(i)$ represents a cooperative detection volume of the i-th pair of radars; and V represents detection volume of a single radar.

Optionally, after determining the total detection volume of the radar communication integrated system based on the detection area volume of each pair of radars and the current power distribution coefficient, the method further comprises:

distributing power of a detection beam and power of a communication beam of each radar in the radar communication integrated system according to the current power distribution coefficient; and transmitting the detection beam and the communication beam according to the distributed power.

In a second aspect, an embodiment of the application provides a radar communication integrated cooperative detection apparatus based on beam power distribution, which is applied to a radar communication integrated system comprising multiple pairs of radars and each pair of radars having ability to cooperatively transmit detection beams and communication beams, the apparatus comprises:

a first determining module configured for determining a farthest detection distance and a detection volume of a single radar in a radar communication integrated system during transmitting of the detection beam when the radar has a preset transmit power;

a second determining module configured for determining a communication success probability of each pair of radars in the radar communication integrated system during transmitting of the communication beams, wherein the communication success probability represents a probability of successfully establishing a connection of communication links between a pair of radars;

a third determining module configured for determining a detection area volume of each pair of radars under different power distribution coefficients based on the farthest detection distance, the detection volume, a different power distribution coefficient of the single radar, and the communication success probability of each pair of radars, wherein the power distribution coefficient is a ratio between power distributed to the detection beam and power distributed to the communication beam;

a fourth determining module configured for determining a power distribution coefficient corresponding to a largest detection area volume from different detection area volumes as a current power distribution coefficient; and a fifth determining module configured for determining total detection volume of the radar communication integrated system based on the detection area volume of each pair of radars and the current power distribution coefficient.

In a third aspect, an embodiment of the present application provides an electronic device comprising a processor, a communication interface, a memory and a communication bus, wherein the processor, the communication interface and the memory communicate with each other via the communication bus; a machine readable storage medium stores machine executable instructions that can be executed by the processor, and the machine executable instructions cause the processor to: implement steps of the radar communication integrated cooperative detection method based on beam power distribution according to the first aspect in the embodiments of the present application.

In a fourth aspect, an embodiment of the present application provides a computer readable storage medium with a computer program stored thereon, wherein the computer program are executed by the processor to implement steps of the radar communication integrated cooperative detection method based on beam power distribution according to the first aspect in the embodiment of the present application.

The radar communication integrated cooperative detection method and apparatus based on beam power distribution according to the embodiments of the present application, can determine a farthest detection distance and a detection volume of a single radar in a radar communication integrated system during transmitting of the detection beam when the radar has a preset transmit power; and determine a communication success probability of each pair of radars during transmitting of the communication beams; and then, determine a detection area volume of each pair of radars under different power distribution coefficients based on the farthest detection distance, the detection volume and a different power distribution coefficient of the single radar, and the communication success probability of each pair of radars; and then determine a power distribution coefficient corresponding to a largest detection area volume from different detection area volumes as a current power distribution coefficient; and determine total detection volume of the radar communication integrated system based on the detection area volume of each pair of radars and the current power distribution coefficient. Since the current power distribution coefficient maximizes the detection area volume, radar detection efficiency can be further improved. Of course, any of the products or methods of implementing the present application must not necessarily need to achieve all the advantages described above.

BRIEF DESCRIPTION OF THE DRAWINGS

In order to more clearly describe the technical solutions of the embodiments of the present application or of the prior art, drawings that need to be used in embodiments and the prior art will be briefly described below. Obviously, the drawings provided below are for only some embodiments of the present application; those skilled in the art can also obtain other drawings based on these drawings without any creative efforts.

DETAILED DESCRIPTION

In order to make the objectives, technical solutions, and advantages of the present application clearer and more understandable, the present application will be described in more detail below with reference to the appended drawings and embodiments. Obviously, the described embodiments are only some, and not all, of the embodiments of the present application. All other embodiments obtained based on the embodiments of the present application by those skilled in the art without any creative efforts fall into the scope of protection defined by the present application.

Figure 1:
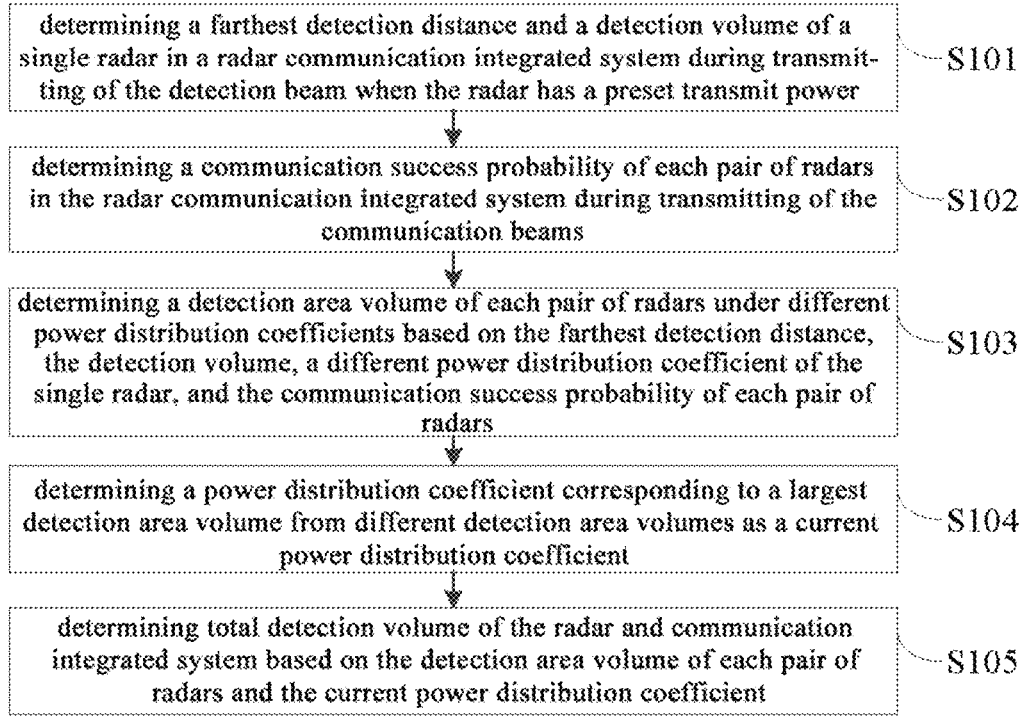
FIG. 1 is a schematic flow chart of a radar communication integrated cooperative detection method based on beam power distribution according to an embodiment of the present application.

In order to improve detection efficiency of radar cooperative detection, an embodiment of the present application provides a radar communication integrated cooperative detection method based on beam power distribution. As shown in FIG. 1, the method may include the following steps.

S101, determining a farthest detection distance and detection volume of a single radar in a radar communication integrated system during transmitting of the detection beam when the radar has a preset transmit power.

Figure 2:
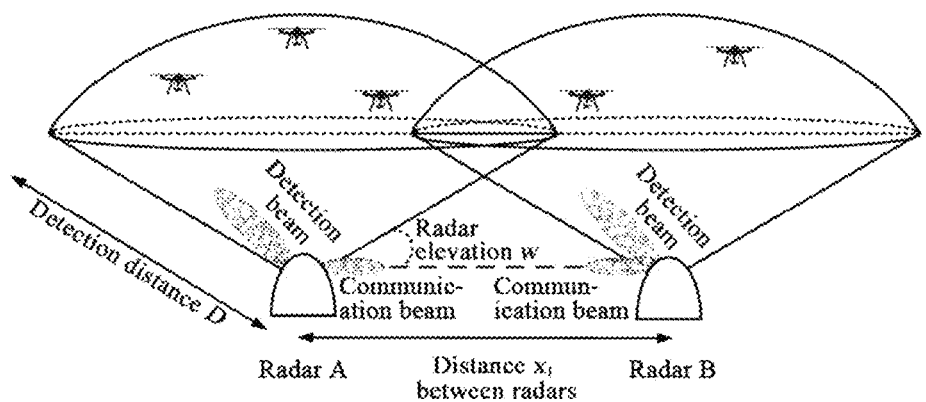
FIG. 2 is a schematic diagram of detection beams and communication beams cooperatively transmitted by a pair of radars.

The embodiment of the present application may be applied to a radar communication integrated system, which may be implemented through one or more radars in the radar communication integrated system, or may be implemented through an electronic device with computing capabilities connected to each radar. The radar communication integrated system includes multiple pairs of radars, and each pair of radars has ability to cooperatively transmit a detection beam and a communication beam. As shown in FIG. 2, a pair of radars, i.e., radar A and radar B are used as an example for illustration. Main beams (detection beams) of the radar A and the radar B are used to detect a drone and other targets in the air. Communication sub-beams (i.e., communication beams) construct a wireless communication link on a two-dimensional plane (e.g., a two-dimensional horizontal plane). In order to prevent a detection beam of radar from causing serious direct interference to communication, a radar elevation $w=\pi/6$ may be set between the detection beam and the communication beam. Assuming that total power of a radar transmitter is P, and power distribution ratio coefficient of the detection beam and the communication beam is $\beta$, then power of the detection beam is $P_R=(1-\beta)P$; and power of the communication beam is $P_c=\beta P$.

Figure 3:
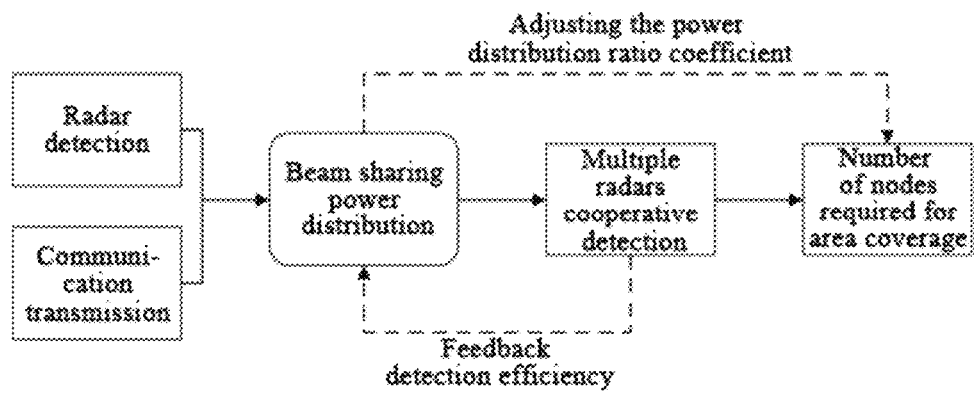
FIG. 3 is a principle block diagram of analysis of radar communication integrated cooperative detection based on beam power distribution.

For analysis of radar communication integrated cooperative detection based on beam power distribution, the analysis principle block diagram is shown in FIG. 3. A module configured for transmitting a radar beam (the detection beam) and a module configured for transmitting the communication beam in radar are two independent modules. These two modules may implement effective power distribution through beam distribution of a transceiver antenna, then may implement detection through the detection beam and implement communication between multiple radars through the communication beam, which realizes multiple radars cooperative detection. Dotted lines indicate that radar deployment strategy may be formulated for an area that needs to be covered by adjusting the power distribution ratio coefficient and according to detection efficiency fed back by the detection beam.

In the embodiment of the present application, when a radar has a preset transmit power, it is possible to determine a farthest detection distance and detection volume of the single radar in a radar communication integrated system during transmitting of a detection beam.

The preset transmit power is a given power of a radar transmitter. Here, determining a farthest detection distance and detection volume of the single radar during transmitting of a detection beam in a radar communication integrated system refers to determining conditions satisfied by the farthest detection distance and the detection volume of the radar. In an implementation, the conditions satisfied by the farthest detection distance and the detection volume each may be presented in the form of an expression. For example, the expression of the farthest detection distance may be determined according to power of the detection beam of a radar and detection parameters of the radar. Detection parameters of radar may include antenna gain, a wavelength of the detection beam, a radar cross-sectional area, a bandwidth for a receiver in the radar, a minimum detectable signal-to-noise ratio for the radar, and so on.

Optionally, a first preset expression may be used to determine the farthest detection distance of the single radar in a radar communication integrated system during transmitting of a detection beam. The first preset expression is:

$$D_{max}^4 = \frac{P_R G^2 \lambda_w^2 \sigma}{(4\pi)^3 k T_0 B_n F_n (SNR_{min})}.$$

In the expression, $P_R$ represents power of the detection beam; G represents antenna gain; $\lambda_w$ represents a wavelength of the detection beam; $\sigma$ represents a radar cross-sectional area for a detected target; k represents the Boltzmann's constant; $T_0$ represents a standard temperature, that is, zero degree Celsius; $B_n$ represents a bandwidth for a receiver in the radar; $F_n$ represents a noise coefficient; $SNR_{min}$ represents a minimum detectable signal-to-noise ratio for the radar; $\pi$ represents the circular constant; and $D_{max}$ represents the farthest detection distance of the single radar in the radar communication integrated system during transmitting of the detection beam.

The radar cross-sectional area may be understood as: the Radar Cross Section (RCS), that is, a reflection cross-sectional area for the radar. The principle of radar detection is that electromagnetic waves are emitted to irradiate a surface of an object and then reflected back to a receiving antenna. After the electromagnetic waves are irradiated on the surface of the target, the fewer the electromagnetic waves returning from the surface of the object along the original path, the smaller the Radar Cross Section, the smaller the signal characteristic of radar relative to the target, and the shorter the detection distance.

Since each radar in the radar communication integrated system may be used to detect a target, and the farthest detection distance of each radar needs to be determined, for each radar, the above $\sigma$ represents the radar cross-sectional area for the radar.

The above standard temperature may be understood as: a temperature preset and used as a reference in a working scene of the radar communication integrated system.

Specifically, the detection volume may be calculated according to the farthest detection distance of the radar and the radar elevation.

Optionally, a second preset expression may be used to determine the detection volume of the single radar in the radar communication integrated system during transmitting of the detection beam. The second preset expression is:

$$V = \frac{2}{3}\pi(\gamma P_R)^{\frac{3}{4}}(1 - \sin w)$$

In the expression, $$\gamma = \frac{G^2 \lambda_w^2 \sigma}{(4\pi)^3 k T_0 B_n F_n (SNR_{min})},$$

$P_R$ represents power of the detection beam; w represents a radar elevation, for example, may be set to $w=\pi/6$; V represents the detection volume of the single radar in the radar communication integrated system during transmitting of the detection beam.

S102, determining communication success probability of each pair of radars in the radar communication integrated system during transmitting communication beams.

In the embodiment of the present application, the communication success probability refers to probability that a connection of communication links can be successfully established when a signal-to-noise ratio received by a communication receiver is greater than a preset threshold, expressed as $P_{success}=P(SINR>\theta)$.

The communication success probability of each pair of radars may be calculated according to power of a communication beam, a radar communication parameter and a distance between the radars. Radar communication parameters may include a large-scale fading factor of wireless channel, a direction factor of a directional antenna, and radar distribution density.

Assuming that radars are randomly distributed in a two-dimensional horizontal plane, and the communication channel satisfies the Rayleigh Fading model, the communication success probability between a pair of radars may be obtained according to the principle of random geometric correlation. The communication success probability between the pair of radars may be expressed using a third preset expression as:

$$P(\text{SINR} > \theta) = \exp\left(-\theta x_1^\alpha \frac{N}{P_C}\right)\exp[-\kappa\lambda U(\theta, x_1, \alpha)].$$

In the expression, θ represents a threshold of communication success rate; $x_1$ represents a distance between a pair of radars; α represents a large-scale fading factor of wireless channel; $x_1^\alpha$ represents a path loss; N represents noise intensity; $P_c$ represents power of a communication beam; κ represents a directional factor of a directional antenna; λ represents a radar distribution density; U represents an integral function $$U(\theta, x_1, \alpha) = \int_0^{2\pi}\int_0^\infty \left(1 - \frac{1}{1+\theta x_1^\alpha r^{-\alpha}}\right) r\, dr\, d\varphi,$$

wherein, r represents an integration factor of a preset distance, φ represents an integration factor of a preset angle; P(SINR>θ) represents the communication success probability between a pair of radars.

S103, determining a detection area volume of each pair of radars under different power distribution coefficients based on the farthest detection distance, the detection volume, a different power distribution coefficient of the single radar, and the communication success probability of each pair of radars.

Specifically, for a single radar, a different power distribution coefficient may be preset for the single radar. Between different single radars, preset power distribution coefficients may be the same or different, which is not limited in the embodiment of the present application.

Based on the farthest detection distance and detection volume of the single radar and the communication success probability of each pair of radars obtained in the above steps, the detection area volume of each pair of radars under different power distribution coefficients may be determined using each preset power distribution coefficient, wherein the power distribution coefficient is a ratio between power distributed to the detection beam and power distributed to the communication beam.

The power distributed to the detection beam may be calculated according to the preset power distribution coefficient, and then according to the expression of the detection volume, the detection volume of radar under the preset power distribution coefficient is calculated as the detection area volume.

Take the pair of radars shown in FIG. 2 as an example. The pair of radars includes radar A and radar B. When power distribution is performed on the detection beam and the communication beam of the pair of radars, the detection area volume of the pair of radars is represented by $V_c$. There may be in three cases as below.

Case 1, β=0, $P_R$=P.

In other words, power of transmitter is all distributed to the detection beam of radar. At this time, the detection distance of the single radar reaches the limit, and the detection area volume is expressed as:

$$V_c(D, \beta) = \frac{2}{3}\pi(\gamma P)^{\frac{3}{4}}(1 - \sin w).$$

In the expression $$\gamma = \frac{G^2 \lambda_w^2 \sigma}{(4\pi)^3 kT_0 B_n F_n (SNR_{min})},$$

P represents a transmit power and w represents a radar elevation.

Case 2, 0<β<1, $P_R$=(1−β)P.

According to the proportional coefficient β, the power of transmitter is distributed to the detection beam and the communication beam of the radars, respectively. For example, as shown in FIG. 2, at this time, a communication transmission channel is established between radar A and radar B, and detection information of the radar B may be transmitted to the radar A, so that the detection area volume of the radar A and the radar B may be fused. The total detection area volume may be expressed using a fourth preset expression as:

$$V_c(D,\beta) = P(\text{SINR}>\theta)V_{Overlap} + [1-P(\text{SINR}>\theta)]V.$$

In the expression, $V_c(D, \beta)$ represents cooperative detection volume of a pair of radars, and this value is affected by two factors D and β; D represents a upper limit of a distance that a single radar can detect when a power coefficient is given for the single radar; β represents a preset power distribution coefficient; P(SINR>θ) represents communication success probability; $V_{overlap}$ represents a volume of overlapped areas detected by a pair of radars cooperatively; V represents detection volume of a single radar.

Case 3, β=1 $P_R$=0.

The power of the transmitter is all distributed to the communication beam, the power distributed to the radar beam is 0, the radar loses its detection ability, and the detection area volume is 0.

S104, determining a power distribution coefficient corresponding to a largest detection area volume from different detection area volumes as a current power distribution coefficient.

In the embodiment of the application, after detection area volume under different power distribution coefficients is determined, a maximum detection area volume may be selected from detection area volumes under the premise that the communication success probability is greater than the threshold of communication success rate, and the power distribution coefficient corresponding to the maximum detection area volume is taken as the current power distribution coefficient. It should be understood that when the current power distribution coefficient is used for power distribution, the detection area volume can be maximized, so that the detection efficiency is maximized as much as possible.

In other words, the above step S104 may be understood as: determining the power distribution coefficient corresponding to the largest detection area volume among different detection area volumes as the current power distribution coefficient.

S105, determining total detection volume of the radar communication integrated system based on the detection area volume of each pair of radars and the current power distribution coefficient.

After the detection area volume of each pair of radars and the current power distribution coefficient are determined, a total detection volume of the radar communication integrated system may be determined. When the radar communication integrated system includes n radars, n−1 communication links are established. In other words, n−1 pairs of radars are selected to realize the communication between the n radars. The total detection volume of the radar communication integrated system is composed of the detection area volume of the n−1 pair of radars. Sum of the detection area volume of the n−1 pairs of radar is calculated, wherein detection volumes of n−2 radars has been repeatedly calculated. Therefore, it is necessary to subtract the detection volumes of the n−2 radars from the sum of the detection area volumes of the n−1 pairs of radars.

Optionally, a fifth preset expression may be used to determine the total detection volume of a radar communication integrated system. $V_n$ denotes the total detection volume. The fifth preset expression is:

$$V_n(D, \beta, x_i) = \sum_{i=1}^{n-1} V_c(i) - (n-2)V.$$

In the expression, $V_n(D, \beta, x_i)$ represents total cooperative detection volume of multiple radars, and this value is affected by three factors D, β and $x_i$; D represents a upper limit of the distance that a single radar can detect when a power coefficient is given for the single radar; β represents a preset power distribution coefficient; i represents the i-th pair of radars; x represents a distance between the i-th pair of radars; $V_c(i)$ represents a cooperative detection volume of the i-th pair of radars; V represents detection volume of a single radar; n is the number of radars. In this embodiment, take the radar communication integrated system in which the detection volume of each radar is the same as an example. In actual scenarios, the detection volume of each radar in the radar communication integrated system may be the same or different. When the detection volume of each radar in the radar communication integrated system is different, it is necessary to subtract the repeatedly calculated detection volume of each radar from the sum of the detection area volume of each pair of radars.

Table 1 shows the total detection volume of cooperative detection by multiple radars in the radar communication integrated system under different power distribution coefficients and different preset threshold conditions.

Table 1: Total detection volume under beam power distributions (n=10) ($V_n$ unit: 1×10⁹ m³)

TABLE 1

| Total detection volume under beam power distributions (n = 10) ($V_n$ unit: 1 × 10⁹ m³) $V_n$ | | | | | | | | | | | |
|---|---|---|---|---|---|---|---|---|---|---|---|
| | β | | | | | | | | | | |
| θ | 0 | 0.1 | 0.2 | 0.3 | 0.4 | 0.5 | 0.6 | 0.7 | 0.8 | 0.9 | 1 |
| 2 | 1.6 | 8.3 | 8.6 | 8.2 | 7.6 | 6.8 | 5.9 | 4.9 | 3.7 | 2.2 | 0 |
| 4 | 1.6 | 6.5 | 7.1 | 7.0 | 6.0 | 6.0 | 5.2 | 4.3 | 3.3 | 2.0 | 0 |
| 6 | 1.6 | 5.4 | 6.2 | 6.2 | 5.9 | 5.4 | 4.8 | 4.0 | 3.0 | 1.8 | 0 |

According to Table 1, when the power distribution coefficient β=0.2, there is the largest cooperative detection volume, that is, the total detection volume. Therefore, in an implementation of the present application, β=0.2 may be used as the current power distribution coefficient. n is the number of radars in the radar communication integrated system.

Figure 4:
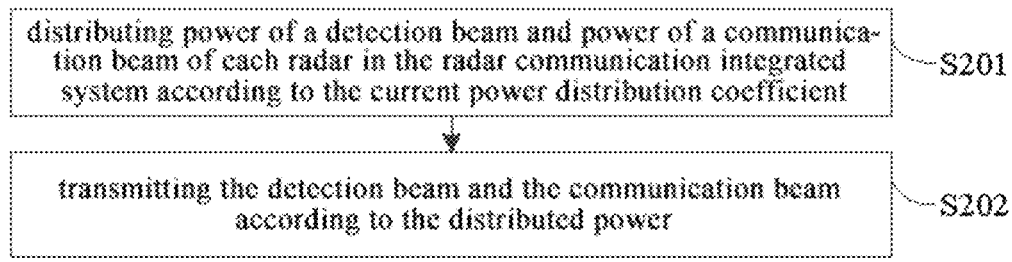
FIG. 4 is another schematic flow chart of a radar communication integrated cooperative detection method based on beam power distribution according to an embodiment of the present application.

As an optional implementation of the embodiment of the present application, as shown in FIG. 4, after step S105, the radar communication integrated cooperative detection method based on beam power distribution according to the embodiment of the present application may further include the followings.

S201, distributing power of detection beam and power of a communication beam of each radar in the radar communication integrated system according to the current power distribution coefficient.

After the current power distribution coefficient is obtained, the power of the detection beam and the power of a communication beam of each radar in the radar communication integrated system may be distributed according to the current power distribution coefficient.

S202, transmitting the detection beam and the communication beam according to the distributed power.

After the power of the detection beam and the power of the communication beam are distributed, the radar may transmit the detection beam and the communication beam according to the distributed power.

The radar communication integrated cooperative detection method based on beam power distribution according to the embodiment of the present application, can determine a farthest detection distance and detection volume of a single radar in a radar communication integrated system during transmitting of the detection beam when a radar has a preset transmit power; and determine communication success probability of each pair of radars during transmitting communication beams; and then, determine a detection area volume of each pair of radars under different power distribution coefficients based on the farthest detection distance, the detection volume and a different power distribution coefficient of the single radar, and the communication success probability of each pair of radars; and then determine a power distribution coefficient corresponding to a largest detection area volume from different detection area volumes as a current power distribution coefficient; and determine total detection volume of the radar communication integrated system based on the detection area volume of each pair of radars and the current power distribution coefficient. Since the current power distribution coefficient maximizes the detection area volume, radar detection efficiency can be further improved.

Figure 5:
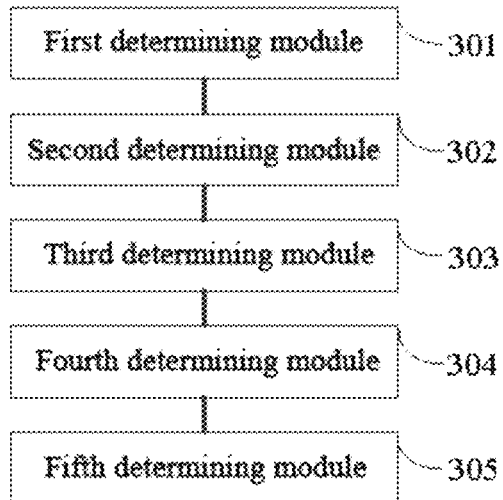
FIG. 5 is a schematic structural diagram of a radar communication integrated cooperative detection apparatus based on beam power distribution according to an embodiment of the present application.

An embodiment of the present application further provides a radar communication integrated cooperative detection apparatus based on beam power distribution, which corresponds to the process shown in FIG. 1. Referring to the FIG. 5, FIG. 5 is a schematic structural diagram of the radar communication integrated cooperative detection apparatus based on beam power distribution according to the embodiment of the application, which is applied to a radar communication integrated system including multiple pairs of radars and each pair of radars has ability to cooperatively transmit detection beams and communication beams. The radar communication integrated cooperative detection apparatus includes:

a first determining module 301 configured for determining a farthest detection distance and detection volume of a single radar in a radar communication integrated system during transmitting of the detection beam when the radar has a preset transmit power;

a second determining module 302 configured for determining communication success probability of each pair of radars in the radar communication integrated system during transmitting communication beams, wherein the communication success probability represents probability of successfully establishing a connection of communication links between a pair of radars;

a third determining module 303 configured for determining a detection area volume of each pair of radars under different power distribution coefficients based on the farthest detection distance, the detection volume, a different power distribution coefficient of the single radar, and the communication success probability of each pair of radars, wherein the power distribution coefficient is a ratio between power distributed to the detection beam and power distributed to the communication beam;

a fourth determining module 304 configured for determining a power distribution coefficient corresponding to a largest detection area volume from different detection area volumes as a current power distribution coefficient; and a fifth determining module 305 configured for determining total detection volume of the radar communication integrated system based on the detection area volume of each pair of radars and the current power distribution coefficient.

In a possible implementation, the first determining module 301 is specifically configured for:

determining the farthest detection distance of the single radar in the radar communication integrated system during transmitting of the detection beam using a first preset expression when the radar has a preset transmit power, wherein, the first preset expression is:

$$D_{max}^4 = \frac{P_R G^2 \lambda_w^2 \sigma}{(4\pi)^3 kT_0 B_n F_n (SNR_{min})},$$

in the expression, $P_R$ represents power of the detection beam; G represents antenna gain; $\lambda_w$ represents a wavelength of the detection beam; $\sigma$ represents a radar cross-sectional area for a detected target; k represents the Boltzmann constant; $T_0$ represents a standard temperature; $B_n$ represents a bandwidth for a receiver in the radar; $F_n$ represents a noise coefficient; and $SNR_{min}$ represents a minimum detectable signal-to-noise ratio for the radar; and determining the detection volume of the single radar in the radar communication integrated system during transmitting of the detection beam using a second preset expression, wherein, the second preset expression is:

$$V = \frac{2}{3}\pi(\gamma P_R)^{\frac{3}{4}}(1 - \sin w),$$

in the expression $$\gamma = \frac{G^2 \lambda_w^2 \sigma}{(4\pi)^3 kT_0 B_n F_n (SNR_{min})};$$

$P_R$ represents the power of the detection beam; and w represents a radar elevation.

In a possible implementation, the second determining module 302 is specifically configured for:

determining the communication success probability of each pair of radars in the radar communication integrated system during transmitting of the communication beams using a third preset expression when the radar has a preset transmit power, wherein the third preset expression is:

$$P(SINR > \theta) = \exp\left(-\theta x_1^\alpha \frac{N}{P_C}\right)\exp[-\kappa\lambda U(\theta, x_1, \alpha)],$$

in the expression, $\theta$ represents a threshold of communication success rate; $x_1$ represents a distance between a pair of radars; $\alpha$ represents a large-scale fading factor of wireless channel; $x_1^\alpha$ represents a path loss; N represents noise intensity; $P_c$ represents power of a communication beam; $\kappa$ represents a directional factor of a directional antenna; $\lambda$ represents a radar distribution density; U represents an integral function $$U(\theta, x_1, \alpha) = \int_0^{2\pi}\int_0^\infty \left(1 - \frac{1}{1 + \theta x_1^\alpha r^{-\alpha}}\right) r dr d\varphi,$$

wherein, r represents an integration factor of a preset distance, $\varphi$ represents an integration factor of a preset angle; $P(SINR>\theta)$ represents the communication success probability between a pair of radars.

In a possible implementation, the third determining module 303 is specifically configured for:

determining a detection area volume of each pair of radars when the radar has a preset transmit power using a fourth preset expression, wherein, the fourth preset expression is:

$$V_c(D,\beta) = P(SINR>\theta)V_{Overlap} + [1-P(SINR>\theta)]V,$$

the expression, $V_c$ represents a detection area volume of a pair of radars; $V_c(D, \beta)$ represents a cooperative detection volume of a pair of radars, and this value is affected by two factors D and $\beta$; D represents a upper limit of a distance that a single radar can detect when a power coefficient is given for the single radar; $\beta$ represents a preset power distribution coefficient; $P(SINR>\theta)$ represents communication success probability; $V_{overlap}$ represents a volume of overlapped areas detected by a pair of radars cooperatively; and V represents detection volume of a single radar.

In a possible implementation, the fifth determining module 305 is specifically configured for:

determining the total detection volume of the radar communication integrated system using a fifth preset expression when the radar has a preset transmit power, wherein, the fifth preset expression is:

$$V_n(D, \beta, x_i) = \sum_{i=1}^{n-1} V_c(i) - (n-2)V,$$

in the expression, $V_n$ represents the total detection volume; $V_n(D, \beta, x_i)$ represents total cooperative detection volume of multiple radars, and this value is affected by three factors D, $\beta$ and $x_i$; D represents a upper limit of the distance that a single radar can detect when a power coefficient is given for the single radar; $\beta$ represents a preset power distribution coefficient; i represents the i-th pair of radars; $x_i$ represents a distance between the i-th pair of radars; $V_c(i)$ represents a cooperative detection volume of the i-th pair of radars; and V represents detection volume of a single radar.

Figure 6:
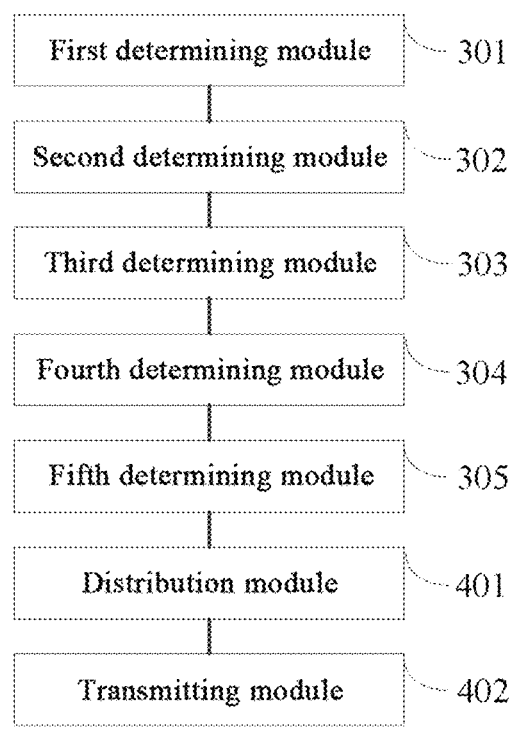
FIG. 6 is another schematic structural diagram of a radar communication integrated cooperative detection apparatus based on beam power distribution according to an embodiment of the present application.

In a possible implementation, based on the apparatus structure shown in FIG. 5, as shown in FIG. 6, the radar communication integrated cooperative detection apparatus based on beam power distribution in the embodiment of the present application may further include:

a distribution module 401 configured for distributing power of detection beam and power of a communication beam of each radar in the radar communication integrated system according to the current power distribution coefficient; and a transmitting module 402 configured for transmitting the detection beam and the communication beam according to the distributed power.

The radar communication integrated cooperative detection apparatus based on beam power distribution according to the embodiment of the present application, can determine a farthest detection distance and detection volume of a single radar in a radar communication integrated system during transmitting of a detection beam when a radar has a preset transmit power; and determine communication success probability of each pair of radars during transmitting communication beams; and then, determine a detection area volume of each pair of radars under different power distribution coefficients based on the farthest detection distance, the detection volume and a different power distribution coefficient of the single radar, and the communication success probability of each pair of radars; and then determine a power distribution coefficient corresponding to a largest detection area volume from different detection area volumes as a current power distribution coefficient; and determine total detection volume of the radar communication integrated system based on the detection area volume of each pair of radars and the current power distribution coefficient. Since the current power distribution coefficient maximizes the detection area volume, radar detection efficiency can be further improved.

Figure 7:
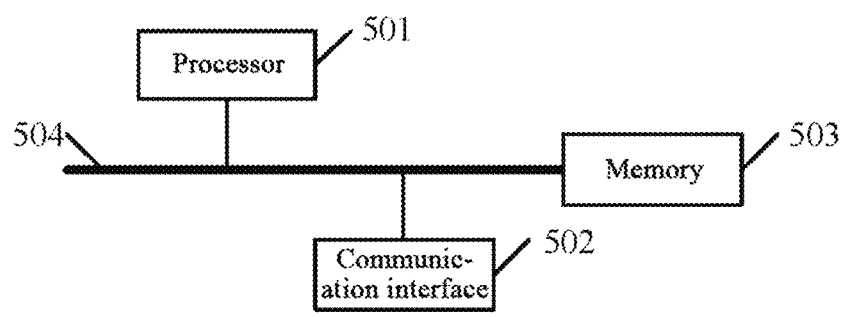
FIG. 7 is a schematic structural diagram of an electronic device according to an embodiment of the application.

An embodiment of the present application provides an electronic device, as shown in FIG. 7, which includes a processor 501, a communication interface 502, a memory 503 and a communication bus 504, wherein the processor 501 the communication interface 502 and the memory 503 communicate with each other via the communication bus 504, the memory 503 is configured for storing computer program;

the processor 501 is configured for implementing the following steps when executing the program stored on the memory 503:

determining a farthest detection distance and detection volume of a single radar in a radar communication integrated system during transmitting of a detection beam when the radar has a preset transmit power;

determining communication success probability of each pair of radars in the radar communication integrated system during transmitting communication beams, wherein the communication success probability represents probability of successfully establishing a connection of communication links between a pair of radars;

determining a detection area volume of each pair of radars under different power distribution coefficients based on the farthest detection distance, the detection volume, a different power distribution coefficient of the single radar, and the communication success probability of each pair of radars, wherein the power distribution coefficient is a ratio between power distributed to the detection beam and power distributed to the communication beam;

determining a power distribution coefficient corresponding to a largest detection area volume from different detection area volumes as a current power distribution coefficient; and determining total detection volume of the radar communication integrated system based on the detection area volume of each pair of radars and the current power distribution coefficient.

Optionally, the processor 501, when configured for executing the program stored on the memory 503, can further implement any of the above-mentioned radar communication integrated cooperative detection methods based on beam power distribution.

The electronic device in the embodiment of the present application may be any radar in the radar communication integrated system, or may be a device with computing capability connected to each radar.

The electronic device according to the embodiment of the present application, can determine a farthest detection distance and detection volume of a single radar in a radar communication integrated system during transmitting of a detection beam when a radar has a preset transmit power; and determine communication success probability of each pair of radars during transmitting communication beams; and then, determine a detection area volume of each pair of radars under different power distribution coefficients based on the farthest detection distance, the detection volume and a different power distribution coefficient of the single radar, and the communication success probability of each pair of radars; and then determine a power distribution coefficient corresponding to a largest detection area volume from different detection area volumes as a current power distribution coefficient; and determine total detection volume of the radar communication integrated system based on the detection area volume of each pair of radars and the current power distribution coefficient. Since the current power distribution coefficient maximizes the detection area volume, radar detection efficiency can be further improved.

The communication bus aforementioned in the electronic device may be a Peripheral Component Interconnect (PCI) bus or an Extended Industry Standard Architecture (EISA) bus and the like. The communication buses may include an address bus, a data bus, a control bus, and the like. For representation, only one thick line is shown in the figure, which does not mean there is only one communication bus or one type of communication bus.

The communications interface is used for communication between the aforementioned electronic device and other devices.

The memories may include a Random-Access Memory (RAM), or a Non-Volatile Memory (NVM), for example at least one disk memory. Optionally, the memory may also be at least one storage device located away from the processor described above.

The aforementioned processor may be a general-purpose processor, such as a Central Processing Unit (CPU), a Network Processor (NP), and the like; it may also be a Digital Signal Processor (DSP), an Application Specific Integrated Circuit (ASIC), a Field-Programmable Gate Array (FPGA) or other programmable logic device, discrete gate or transistor logic device, discrete hardware component.

An embodiment of the present application further provides a computer readable storage medium, and a computer program is stored in the computer readable storage medium for executing the following steps:

determining a farthest detection distance and detection volume of a single radar in a radar communication integrated system during transmitting of a detection beam when the radar has preset transmit power;

determining communication success probability of each pair of radars in the radar communication integrated system during transmitting communication beams, wherein the communication success probability indicates probability of successfully establishing a connection of communication links between a pair of radars;

determining a detection area volume of each pair of radars under different power distribution coefficients based on the farthest detection distance, the detection volume, a different power distribution coefficient of the single radar, and the communication success probability of each pair of radars, wherein the power distribution coefficient is a ratio between power distributed to the detection beam and power distributed to the communication beam;

determining a power distribution coefficient corresponding to a largest detection area volume from different detection area volumes as a current power distribution coefficient; and determining total detection volume of the radar communication integrated system based on the detection area volume of each pair of radars and the current power distribution coefficient.

Optionally, the computer program stored in the computer readable storage medium may also be configured for executing any of the above-mentioned radar communication integrated cooperative detection methods based on beam power distribution.

The computer readable storage medium according to the embodiment of the present application, can determine a farthest detection distance and detection volume of a single radar in a radar communication integrated system during transmitting of a detection beam when a radar has a preset transmit power; and determine communication success probability of each pair of radars during transmitting communication beams; and then, determine a detection area volume of each pair of radars under different power distribution coefficients based on the farthest detection distance, the detection volume and a different power distribution coefficient of the single radar, and the communication success probability of each pair of radars; and then determine a power distribution coefficient corresponding to a largest detection area volume from different detection area volumes as a current power distribution coefficient; and determine total detection volume of the radar communication integrated system based on the detection area volume of each pair of radars and the current power distribution coefficient. Since the current power distribution coefficient maximizes the detection area volume, radar detection efficiency can be further improved.

An embodiment of the present application further provides a computer program product containing instructions which, when executed by a computer, causes the computer to execute any of the above-mentioned radar communication integrated cooperative detection methods based on beam power allocation.

It should be noted, the apparatus, electronic device and storage medium of the present application embodiments are respectively the apparatus, electronic device and storage medium that apply the above-mentioned radar communication integrated cooperative detection methods based on beam power distribution, then all the embodiments of the above-mentioned radar communication integrated cooperative detection method based on beam power distribution are applicable to the apparatus, electronic device and storage medium, and all can achieve the same or similar beneficial effects.

It should be noted that the relationship terms used here, such as "first," "second," and the like are only used to distinguish one entity or operation from another entity or operation, but do not necessarily require or imply that there is actual relationship or order between these entities or operations. Moreover, the terms "include," "comprise," or any variants thereof are intended to cover a non-exclusive inclusion, such that processes, methods, articles, or devices, including a series of elements, include not only those elements that have been listed, but also other elements that have not specifically been listed or the elements intrinsic to these processes, methods, articles, or devices. Without further limitations, elements limited by the wording "comprise(s) a/an . . . " and "include(s) a/an . . . " do not exclude additional identical elements in the processes, methods, articles, or devices, including the listed elements.

All of the embodiments in the description are described in a correlated manner, and identical or similar parts in various embodiments can refer to one another. In addition, the description for each embodiment focuses on the differences from other embodiments. In particular, the embodiments of the apparatus/the electronic device/the storage medium/the computer program product is described briefly, since it is substantially similar to the embodiment of the method, and the related contents can refer to the description of the embodiment of the method.

The embodiments described above are simply preferable embodiments of the present application, and are not intended to limit the scope of protection of the present application. Any modifications, alternatives, improvements, or the like within the spirit and principle of the present application shall be included within the scope of protection of the present application.

What is claimed is:

1. A radar communication integrated cooperative detection method based on beam power distribution, which is applied to a radar communication integrated system comprising multiple pairs of radars and each pair of radars having ability to cooperatively transmit detection beams and communication beams, the method comprises:

determining a farthest detection distance and a detection volume of a single radar in a radar communication integrated system during transmitting of the detection beam when the radar has a preset transmit power;

determining a communication success probability of each pair of radars in the radar communication integrated system during transmitting of the communication beams, wherein the communication success probability represents a probability of successfully establishing a connection of communication links between a pair of radars;

determining a detection area volume of each pair of radars under different power distribution coefficients based on the farthest detection distance, the detection volume, a different power distribution coefficient of the single radar, and the communication success probability of each pair of radars, wherein the power distribution coefficient is a ratio between power distributed to the detection beam and power distributed to the communication beam;

determining a power distribution coefficient corresponding to a largest detection area volume from different detection area volumes as a current power distribution coefficient; and determining total detection volume of the radar communication integrated system based on the detection area volume of each pair of radars and the current power distribution coefficient.

2. The method according to claim 1, wherein determining the farthest detection distance and the detection volume of the single radar in the radar communication integrated system during transmitting of the detection beam when the radar has the preset transmit power, comprises:

determining the farthest detection distance of the single radar in the radar communication integrated system during transmitting of the detection beam using a first preset expression when the radar has the preset transmit power, wherein, the first preset expression is:

$$D_{max}^4 = \frac{P_R G^2 \lambda_w^2 \sigma}{(4\pi)^3 k T_0 B_n F_n (SNR_{min})},$$

in the expression, $P_R$ represents power of the detection beam; G represents antenna gain; $\lambda_w$ represents a wavelength of the detection beam; $\sigma$ represents a radar cross-sectional area for a detected target; k represents Boltzmann constant; $T_0$ represents a standard temperature; $B_n$ represents a bandwidth for a receiver in the radar; $F_n$ represents a noise coefficient; $SNR_{min}$ represents a minimum detectable signal-to-noise ratio for the radar; $\pi$ represents the circular constant; and $D_{max}$ represents the farthest detection distance of the single radar in the radar communication integrated system during transmitting of the detection beam; and determining the detection volume of the single radar in the radar communication integrated system during transmitting of the detection beam using a second preset expression when the radar has the preset transmit power, wherein, the second preset expression is:

$$V = \frac{2}{3}\pi(\gamma P_R)^{\frac{3}{4}}(1 - \sin w),$$

in the expression $$\gamma = \frac{G^2 \lambda_w^2 \sigma}{(4\pi)^3 k T_0 B_n F_n (SNR_{min})};$$

$P_R$ represents the power of the detection beam; w represents a radar elevation; V represents the detection volume of the single radar in the radar communication integrated system during transmitting of the detection beam.

3. The method according to claim 1, wherein determining the communication success probability of each pair of radars in the radar communication integrated system during transmitting of the communication beams, comprises:

determining the communication success probability of each pair of radars in the radar communication integrated system during transmitting of the communication beams using a third preset expression when the radar has the preset transmit power, wherein the third preset expression is:

$$P(SINR > \theta) = \exp\left(-\theta x_1^\alpha \frac{N}{P_C}\right)\exp[-\kappa\lambda U(\theta, x_1, \alpha)],$$

in the expression, $\theta$ represents a threshold of the communication success probability; $x_1$ represents a distance between a pair of radars; $\alpha$ represents a large-scale fading factor of wireless channel; $x_1^\alpha$ represents a path loss; N represents noise intensity; $P_c$ represents power of a communication beam; $\kappa$ represents a directional factor of a directional antenna; $\lambda$ represents a radar distribution density; U represents an integral function $$U(\theta, x_1, \alpha) = \int_0^{2\pi}\int_0^\infty\left(1 - \frac{1}{1 + \theta x_1^\alpha r^{-\alpha}}\right)r\,dr\,d\varphi,$$

wherein, r represents an integration factor of a preset distance, $g_0$ represents an integration factor of a preset angle; $P(SINR>\theta)$ represents the communication success probability between a pair of radars.

4. The method according to claim 1, wherein determining the detection area volume of each pair of radars under different power distribution coefficients based on the farthest detection distance, the detection volume, a different power distribution coefficient of the single radar, and the communication success probability of each pair of radars, comprises:

determining a detection area volume of each pair of radars when the radar has the preset transmit power using a fourth preset expression, wherein, the fourth preset expression is:

$$V_c(D,\beta)=P(SINR>\theta)V_{Overlap}+[1-P(SINR>\theta)]V,$$

in the expression, $V_c$ represents a detection area volume of a pair of radars; $V_c(D, \beta)$ represents a cooperative detection volume of a pair of radars, and this value is affected by D and $\beta$; D represents a upper limit of a distance that the single radar can detect when a power coefficient is given for the single radar; $\beta$ represents a preset power distribution coefficient; $P(SINR>\theta)$ represents the communication success probability; $V_{overlap}$ represents a volume of overlapped areas detected by a pair of radars cooperatively; and V represents a detection volume of the single radar.

5. The method according to claim 1, wherein determining the total detection volume of the radar communication integrated system based on the detection area volume of each pair of radars and the current power distribution coefficient, comprises:

determining the total detection volume of the radar communication integrated system using a fifth preset expression when the radar has the preset transmit power, wherein, the fifth preset expression is:

$$V_n(D, \beta, x_i) = \sum_{i=1}^{n-1} V_c(i) - (n-2)V,$$

in the expression, $V_n$ represents the total detection volume; $V_n(D, \beta, x_i)$ represents total cooperative detection volume of multiple radars, and this value is affected by D, $\beta$ and $x_1$; D represents a upper limit of the distance that the single radar can detect when a power coefficient is given for the single radar; $\beta$ represents a preset power distribution coefficient; i represents the i-th pair of radars; $x_i$ represents a distance between the i-th pair of radars; $V_c(i)$ represents a cooperative detection volume of the i-th pair of radars; and V represents a detection volume of the single radar, n represents the number of radars.

6. The method according to claim 1, wherein, after determining the total detection volume of the radar communication integrated system based on the detection area volume of each pair of radars and the current power distribution coefficient, the method further comprises:

distributing power of a detection beam and power of a communication beam of each radar in the radar communication integrated system according to the current power distribution coefficient; and transmitting the detection beam and the communication beam according to the distributed power.

7. An electronic device comprising a processor, a communication interface, a memory and a communication bus, wherein the processor, the communication interface and the memory communicate with each other via the communication bus;

the memory is configured for storing a computer program; and the processor is configured for implementing steps of the method according to claim 1 when executing the program stored on the memory.

8. A non-transitory computer readable storage medium with a computer program stored thereon, wherein the computer program are executed by the processor to implement steps of the method according to claim 1.

9. A radar communication integrated cooperative detection apparatus based on beam power distribution, which is applied to a radar communication integrated system comprising multiple pairs of radars and each pair of radars having ability to cooperatively transmit detection beams and communication beams, the apparatus comprises:

a first determining module configured for determining a farthest detection distance and a detection volume of a single radar in the radar communication integrated system during transmitting of the detection beam when the radar has a preset transmit power;

a second determining module configured for determining a communication success probability of each pair of radars in the radar communication integrated system during transmitting of the communication beams, wherein the communication success probability represents a probability of successfully establishing a connection of communication links between a pair of radars;

a third determining module configured for determining a detection area volume of each pair of radars under different power distribution coefficients based on the farthest detection distance, the detection volume, a different power distribution coefficient of the single radar, and the communication success probability of each pair of radars, wherein the power distribution coefficient is a ratio between power distributed to the detection beam and power distributed to the communication beam;

a fourth determining module configured for determining a power distribution coefficient corresponding to a largest detection area volume from different detection area volumes as a current power distribution coefficient; and a fifth determining module configured for determining a total detection volume of the radar communication integrated system based on the detection area volume of each pair of radars and the current power distribution coefficient.

10. The apparatus according to claim 9, wherein the first determining module is specifically configured for:

determining the farthest detection distance of the single radar in the radar communication integrated system during transmitting of the detection beam using a first preset expression when the radar has the preset transmit power, wherein, the first preset expression is:

$$D_{max}^4 = \frac{P_R G^2 \lambda_w^2 \sigma}{(4\pi)^3 k T_0 B_n F_n (SNR_{min})},$$

in the expression, $P_R$ represents power of the detection beam; G represents antenna gain; $\lambda_w$ represents a wavelength of the detection beam; $\sigma$ represents a radar cross-sectional area for a detected target; k represents the Boltzmann constant; $T_0$ represents a standard temperature; $B_n$ represents a bandwidth for a receiver in the radar; $F_n$ represents a noise coefficient; $SNR_{min}$ represents a minimum detectable signal-to-noise ratio for the radar; $\pi$ represents the circular constant; and $D_{max}$ represents the farthest detection distance of the single radar in the radar communication integrated system during transmitting of the detection beam; and determining the detection volume of the single radar in the radar communication integrated system during transmitting of the detection beam using a second preset expression, wherein, the second preset expression is:

$$V = \frac{2}{3}\pi(\gamma P_R)^{\frac{3}{4}}(1 - \sin w),$$

in the expression $$\gamma = \frac{G^2 \lambda_w^2 \sigma}{(4\pi)^3 k T_0 B_n F_n (SNR_{min})};$$

$P_R$ represents the power of the detection beam; w represents a radar elevation; V represents the detection volume of the single radar in the radar communication integrated system during transmitting of the detection beam.

11. The apparatus according to claim 9, wherein the second determining module is specifically configured for:

determining the communication success probability of each pair of radars in the radar communication integrated system during transmitting of the communication beams using a third preset expression when the radar has a preset transmit power, wherein the third preset expression is:

$$P(SINR > \theta) = \exp\left(-\theta x_1^\alpha \frac{N}{P_C}\right)\exp[-\kappa \lambda U(\theta, x_1, \alpha)],$$

in the expression, $\theta$ represents a threshold of the communication success probability; $x_1$ represents a distance between a pair of radars; $\alpha$ represents a large-scale fading factor of wireless channel; $x_1^\alpha$ represents a path loss; N represents noise intensity; $P_c$ represents power of a communication beam; $\kappa$ represents a directional factor of a directional antenna; $\lambda$ represents a radar distribution density; U represents an integral function $$U(\theta, x_1, \alpha) = \int_0^{2\pi} \int_0^\infty \left(1 - \frac{1}{1 + \theta x_1^\alpha r^{-\alpha}}\right) r dr d\varphi,$$

wherein, r represents an integration factor of a preset distance, $\varphi$ represents an integration factor of a preset angle; $P(SINR > \theta)$ represents the communication success probability between a pair of radars.

12. The apparatus according to claim 9, wherein the third determining module is specifically configured for:

determining a detection area volume of each pair of radars when the radar has a preset transmit power using a fourth preset expression, wherein, the fourth preset expression is:

$$V_c(D,\beta)=P(\text{SINR}>\theta)V_{Overlap}+[1-P(\text{SINR}>\theta)]V,$$

in the expression, $V_c$ represents a detection area volume of a pair of radars; $V_c(D, \beta)$ represents a cooperative detection volume of a pair of radars, and this value is affected by two factors D and β; D represents a upper limit of a distance that the single radar can detect when a power coefficient is given for the single radar; β represents a preset power distribution coefficient; P(SINR>θ) represents the communication success probability; $V_{overlap}$ represents a volume of overlapped areas detected by a pair of radars cooperatively; and V represents a detection volume of the single radar.

13. The apparatus according to claim 9, wherein the fifth determining module is specifically configured for:

determining the total detection volume of the radar communication integrated system using a fifth preset expression when the radar has a preset transmit power, wherein, the fifth preset expression is:

$$V_n(D, \beta, x_i) = \sum_{i=1}^{n-1} V_c(i) - (n-2)V,$$

in the expression, $V_n$ represents the total detection volume; $V_n(D, \beta, x_i)$ represents total cooperative detection volume of multiple radars, and this value is affected by three factors D, β and $x_i$; D represents a upper limit of the distance that the single radar can detect when a power coefficient is given for the single radar; β represents a preset power distribution coefficient; i represents the i-th pair of radars; $x_i$ represents a distance between the i-th pair of radars; $V_c(i)$ represents a cooperative detection volume of the i-th pair of radars; and V represents a detection volume of the single radar.

14. The apparatus of claim 9, wherein the apparatus further comprises:

a distribution module configured for distributing power of a detection beam and power of a communication beam of each radar in the radar communication integrated system according to the current power distribution coefficient; and a transmitting module configured for transmitting the detection beam and the communication beam according to the distributed power.

* * * * *